US012560077B2

(12) United States Patent
Duncan et al.

(10) Patent No.: US 12,560,077 B2
(45) Date of Patent: Feb. 24, 2026

(54) APPARATUS, SYSTEM, AND METHOD FOR INDICATING A POSITION OF AN ACTUATOR OF WELLSITE EQUIPMENT

(71) Applicant: Intelligent Wellhead Systems Inc., Calgary (CA)

(72) Inventors: Robert Duncan, Calgary (CA); Murad Mohammad, Airdrie (CA); Bradley Robert Martin, Calgary (CA)

(73) Assignee: Intelligent Wellhead Systems Inc., Calgary (CA)

( * ) Notice: Subject to any disclaimer, the term of this patent is extended or adjusted under 35 U.S.C. 154(b) by 1050 days.

(21) Appl. No.: 17/348,497

(22) Filed: Jun. 15, 2021

(65) Prior Publication Data

US 2022/0397030 A1 Dec. 15, 2022

(51) Int. Cl.
*E21B 47/002* (2012.01)
*F16K 37/00* (2006.01)
*G01D 11/24* (2006.01)

(52) U.S. Cl.
CPC ........ *E21B 47/002* (2020.05); *F16K 37/0041* (2013.01); *G01D 11/245* (2013.01)

(58) Field of Classification Search
CPC ............... E21B 47/002; E21B 43/2607; F16K 37/0041; G01D 11/245
See application file for complete search history.

(56) References Cited

U.S. PATENT DOCUMENTS

| | | | | |
|---|---|---|---|---|
| 4,438,820 A | * | 3/1984 | Gibson | E21B 47/022 |
| | | | | 175/45 |
| 5,768,946 A | * | 6/1998 | Fromer | G05G 1/38 |
| | | | | 74/514 |
| 6,041,815 A | * | 3/2000 | Nichols | F16K 37/0041 |
| | | | | 251/33 |
| 6,154,704 A | * | 11/2000 | Jericevic | E21B 47/04 |
| | | | | 702/6 |
| 6,223,112 B1 | * | 4/2001 | Nishino | F16H 59/0204 |
| | | | | 701/55 |
| 6,578,686 B2 | * | 6/2003 | Nelson | F16D 3/50 |
| | | | | 116/227 |
| 6,809,512 B2 | * | 10/2004 | Pfaffenberger | G01B 7/003 |
| | | | | 324/207.2 |
| 7,549,440 B1 | * | 6/2009 | Campbell | F16K 37/0008 |
| | | | | 137/553 |
| 7,609,056 B2 | * | 10/2009 | Junk | F16K 37/0041 |
| | | | | 137/553 |
| 10,677,617 B2 | * | 6/2020 | Ausserlechner | G01D 11/24 |
| 11,274,520 B2 | * | 3/2022 | Martin | E21B 47/06 |
| 11,608,708 B2 | * | 3/2023 | Martin | E21B 34/025 |
| 11,939,859 B2 | * | 3/2024 | Kroslid | G05B 15/02 |

(Continued)

*Primary Examiner* — Kristina M Deherrera
*Assistant Examiner* — Tania Courson
(74) *Attorney, Agent, or Firm* — Osha Bergman Watanabe & Burton LLP

(57) ABSTRACT

Embodiments of the present disclosure relate to an apparatus, a system, and a method for detecting and indicating the position of an actuator of wellsite equipment. The apparatus comprises a housing, the housing comprising a first housing portion operatively coupleable to the actuator and a second housing portion configured to receive at least one sensor therewithin. The at least one sensor provides an output signal indicative of the position of the actuator. The position of the actuator is indicative of a valve position.

11 Claims, 10 Drawing Sheets

(56) References Cited

U.S. PATENT DOCUMENTS

| | | | |
|---|---|---|---|
| 11,988,065 B2 * | 5/2024 | Martin | E21B 47/06 |
| 12,084,944 B2 * | 9/2024 | Martin | E21B 34/025 |
| 12,215,566 B2 * | 2/2025 | Martin | E21B 43/2607 |
| 2007/0034264 A1 * | 2/2007 | Kunz | F16K 31/042 |
| | | | 137/554 |
| 2008/0156121 A1 * | 7/2008 | Radomsky | F16K 37/0083 |
| | | | 137/554 |
| 2009/0171544 A1 * | 7/2009 | Tanaka | F16H 61/12 |
| | | | 701/55 |
| 2012/0073670 A1 * | 3/2012 | Lymberopoulos | F16K 31/42 |
| | | | 137/2 |
| 2020/0224526 A1 * | 7/2020 | Parmeshwar | E21B 47/024 |
| 2023/0383644 A1 * | 11/2023 | Duncan | E21B 41/00 |
| 2023/0392470 A1 * | 12/2023 | Martin | E21B 43/2607 |
| 2024/0077147 A1 * | 3/2024 | Duncan | E21B 34/02 |
| 2024/0084669 A1 * | 3/2024 | Martin | E21B 33/03 |
| 2024/0288088 A1 * | 8/2024 | Donovan | E03B 7/072 |
| 2024/0309754 A1 * | 9/2024 | Duncan | F16K 37/00 |
| 2025/0180139 A1 * | 6/2025 | Sapija | F16K 37/0083 |

* cited by examiner

FIG. 6A
FIG. 6B
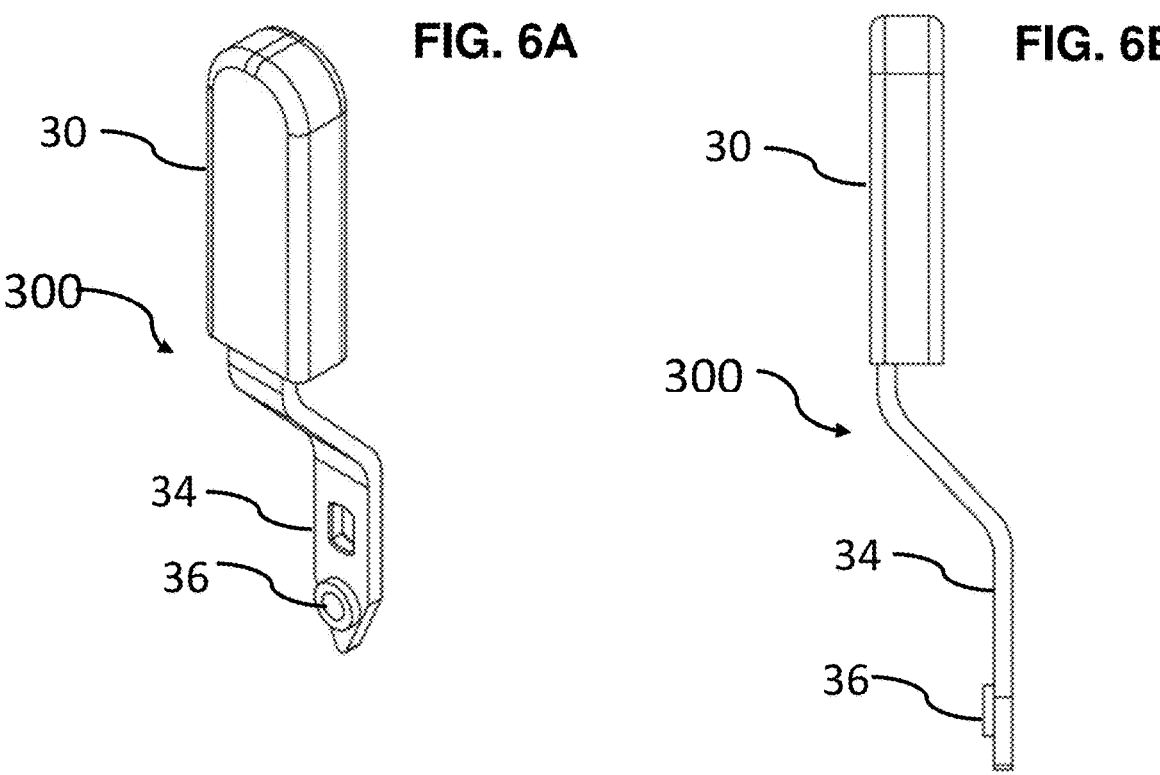
FIG. 6C
FIG. 6D
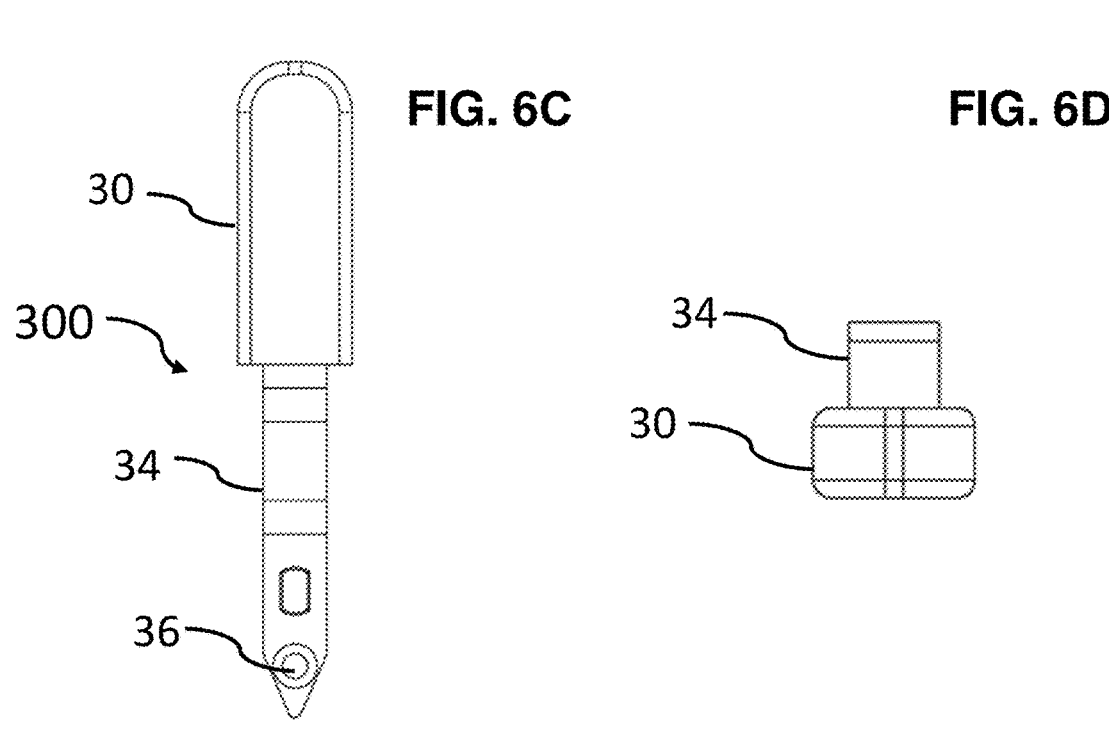

1000

2000

2000A

APPARATUS, SYSTEM, AND METHOD FOR INDICATING A POSITION OF AN ACTUATOR OF WELLSITE EQUIPMENT

TECHNICAL FIELD

This disclosure generally relates to wellsite equipment. In particular, the disclosure relates to an apparatus, system, and method for indicating a position of an actuator of wellsite equipment.

BACKGROUND

The oil and gas industry is increasingly incorporating digitalization to assist in production monitoring and decision making at a wellsite and on a well pad. When hydrocarbon recovery includes hydraulic fracturing, one of the key pieces of information at the wellsite is to know the position of the valves on the frac tree and/or zipper manifold. It is critical to know whether a valve is open, closed, or in a position in between. Currently, service operators send an individual to visually check the position of a valve actuator. This may require an individual to enter or pass through one or more hazardous areas of the well pad. In other instances, service operators may use some form of reporting technology for obtaining valve position information that is typically either mounted to the frac-head valve itself or permanently installed on a specialized accumulator.

One drawback of mounting equipment on the frac tree is that the differences in valves, including from different vendors or suppliers, necessitates different mounting hardware for different valves, which can be inefficient and costly for installation. For example, installing frac valve position sensors often requires a wellsite visit by a technician to first determine the valves that are in use, followed by time spent developing a plan to ensure that the position sensors are appropriate for the valves at the wellsite. Further, the height of some frac trees can also pose challenges with respect to easily accessing the mounting location.

A drawback of permanently installed valve-position equipment, as an integral part of a specialized accumulator, is that the information acquired from this equipment may not be readily shared by vendors or suppliers with other services requiring it. Not having or sharing all of the data negates, to a certain degree, the usefulness of the valve position information because different service operators on a wellsite may require the valve position information at a given time, but only some may be able to access it. Furthermore, such specialized accumulators are costly; particularly, when one considers that the specialized unit would likely replace an existing, non-specialized unit that performs the accumulator functions properly.

Therefore, a need exists for an improved way to obtain valve position information at the wellsite or well pad.

SUMMARY

The embodiments of the present disclosure relate to an apparatus, system, and method for indicating a position of an actuator of wellsite equipment.

Some embodiments of the present disclosure provide an apparatus for detecting and indicating a position of an actuator of wellsite equipment. The apparatus comprising a housing, the housing comprising a first housing portion operatively coupleable to the actuator and a second housing portion configured to receive and retain at least one actuator-position sensor therewithin.

In some embodiments of the present disclosure, the apparatus for detecting and indicating a position of an actuator of wellsite equipment further comprises at least one actuator-position sensor, wherein the at least one actuator-position sensor is configured to detect the position of the actuator and to provide an output signal indicative of the position of the actuator.

Some embodiments of the present disclosure provide a system for detecting and indicating a position of an actuator of wellsite equipment, the system comprising: an apparatus comprising: at least one sensor detecting the position of the actuator and for providing an output signal indicative of the position of the actuator. The system also includes a housing that comprises a first housing portion operatively coupleable to the actuator and a second housing portion configured to receive and retain the at least one sensor there within. The system further comprising a processor for receiving and processing the output signal into a processed output signal.

In some embodiments of the present disclosure, the system further comprises a remote display unit for receiving the processed signal and displaying an image indicative of the position of the actuator.

Some embodiments of the present disclosure provide a method for detecting and indicating a position of an actuator of wellsite equipment. The method comprising the steps of securing an apparatus to the actuator; detecting and indicating the position of the actuator with at least one sensor of the apparatus; and, observing the output signal.

Without being bound by any particular theory, the embodiments of the present disclosure provide an apparatus, system, and method that generate information about the position of an actuator, such as a valve handle can be obtained. Knowing the position of a valve handle may provide information about the position of valves that regulate the flow of fluids towards, through or away from an accumulator of a wellsite or well pad hydraulic system, a frac flow control unit, a frac zipper-manifold, a frac tree, a well Christmas tree, a blowout preventer, or therebetween may help avoid accidents at the wellsite and/or well pad. Examples of such accidents can include when a wellhead valve is opened or closed at the incorrect time during a well operation, such as a hydraulic fracking operation or a wireline operation. Furthermore, some embodiments of the present disclosure permit aggregating, displaying and sharing of valve position information between different individuals working on the same wellsite and multiple wellsites of a given well pad and individuals who are overseeing operations of multiple wellsites from a remote location. Furthermore, the embodiments of the present disclosure can be added to existing wellsite equipment, which facilitates the sharing of actuator position information across individuals with access to different computer systems and different information technology infrastructures. In effect, the embodiments of the present disclosure are agnostic to the specific computer and data systems that individuals may already be using in relation to wellsite operations.

BRIEF DESCRIPTION OF THE DRAWINGS

These and other features of the present disclosure will become more apparent in the following detailed description in which reference is made to the appended drawings.

FIGS. 1A and 1B show one embodiment of an apparatus, according to the present disclosure, in use on a valve-handle actuator, wherein FIG. 1A is an isometric view from a first side of the actuator; and, FIG. 1B is an isometric view from a second and opposite side of the actuator.

FIGS. 3A and 3B show another embodiment of an apparatus, according to the present disclosure, wherein FIG. 3A is an isometric view from a first side of the apparatus; and, FIG. 3B is an isometric view from a second and opposite side of the apparatus.

FIGS. 5A and 5B show an apparatus, according to embodiments of the present disclosure, in use with a valve-handle actuator of a lever valve, wherein FIG. 5A shows an isometric view of the apparatus in a first position from a first side of the level valve; and, FIG. 5B shows an isometric view of the apparatus in the first position from a second end of the accumulator.

FIGS. 6A, 6B, 6C and 6D show another apparatus, according to embodiments of the present disclosure, wherein FIG. 6A is an isometric view from a first side of the apparatus; FIG. 6B is a side view of the apparatus; FIG. 6C is a view from a second side of the apparatus; and, FIG. 6D is a top plan view.

DETAILED DESCRIPTION

Figures 1A, 1B:
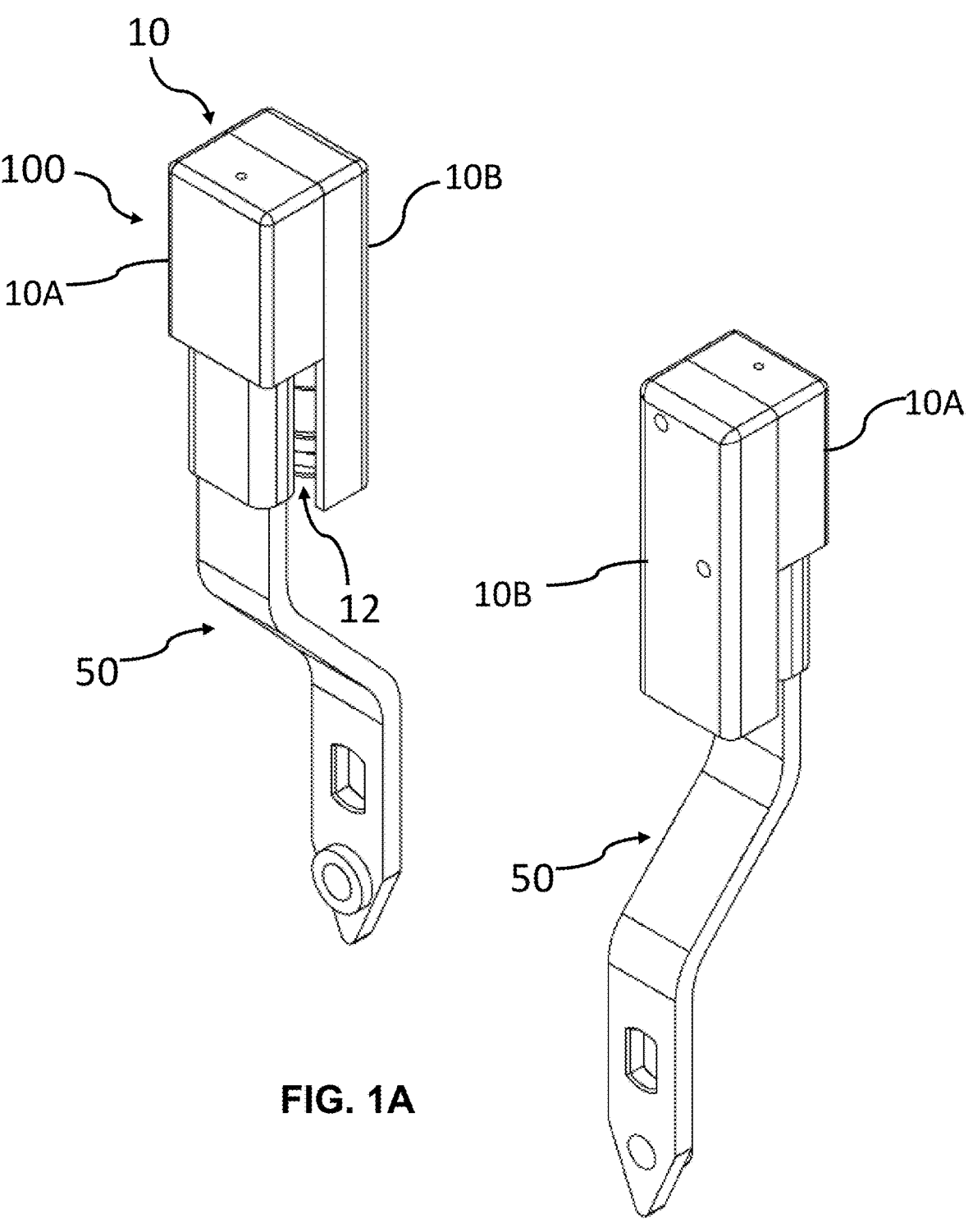

The embodiments of the present disclosure relate to an apparatus, system, and method for detecting and indicating a position of an actuator that controls one or more features of wellsite equipment. As used herein, the expression "actuator of wellsite equipment" is intended to refer to an actuator that is a component or part of a piece of equipment that can be used or is used at a wellsite. In some embodiments, the actuator directly or indirectly regulates the position of a valve and may be referred to as a valve actuator herein. In some embodiments, the position of the valve regulates the flow of fluids through the valve so as to influence the operation of the wellsite equipment.

A number of different control mechanisms regulate the flow of fluids through the well. For example, valves within the well can open and close to control the flow of hydraulic fracturing fluids to and from the well by controlling fluid flow through different sections of a surface-borne, hydraulic fracturing system. The position of each valve may be controlled by a valve actuator. Some valve actuators may be positioned on the wellhead for direct control of a wellhead valve and some valve actuators may be positioned remotely from the wellhead for indirect control of a wellhead valve. Similarly, there may be valve actuators that control the operational position of a valve that is part of wellsite equipment (other than a wellhead valve) that may act directly or indirectly upon the valve. Valve actuators can control the operational position of a valve through one or more of manual, hydraulic, pneumatic or electronically actuated control mechanisms. In some embodiments, a valve actuator is a lever-handle, also referred to as a valve-lever. In some embodiments of Some embodiments of the present disclosure relate to an apparatus, system and method for detecting and indicating the position of an actuator of wellsite equipment. For the purposes of this disclosure, the term "detecting" and similar terms, refer to providing positional information of the actuator, relative to a fixed point. For the purposes of this disclosure, the term "indicating" and similar terms, refer to conveying the detected position of the actuator. The apparatus comprises a housing with a first housing portion and a second housing portion. The first housing portion is operatively coupleable to the actuator and the second housing portion is configured to receive and retain at least one sensor therewithin. When the apparatus is coupled to the actuator, the apparatus may further comprise at least one sensor that is configured to detect and indicate whether the actuator is in a first position, a second position, or an intermediate position therebetween. Moving the actuator between the first, second and intermediate position will permit, restrict, or stop at least a portion of fluids from flowing through, to or from a valve. In some embodiments, the apparatus comprises at least one sensor, wherein the at least one sensor provides an output signal indicative of the position of the actuator.

Some embodiments of the present disclosure relate to a system for detecting and indicating the position of an actuator that forms part of wellsite equipment. The system comprises an apparatus, at least one sensor and a processor. The apparatus comprises a housing with a first housing portion that is operatively coupleable to the actuator and a second housing portion that is configured to receive the at least one sensor therewithin. The at least one sensor is configured to provide an output signal indicative of the position of the actuator. The processor is operatively coupled to the at least one sensor and configured to receive and process an output signal from the at least one sensor. The processor is further configured to generate the processed output signal as a display signal. In some embodiments of the present disclosure, the system further comprises a remote display unit for receiving the display signal and for generating a display that is indicative of the position of the actuator. In some embodiments, the remote display unit may form part of a Human-Machine-Interface (HMI) and/or the remote display unit may be part of an individual computer display.

Some embodiments of the present disclosure relate to a method of detecting and indicating a position of an actuator that forms part of wellsite equipment. The method comprises the steps of securing an apparatus and at least one sensor to the actuator and observing an output signal generated by the at least one sensor. The apparatus comprises housing with a first housing portion that is operatively coupleable to the actuator and a second housing portion that is configured to receive the at least one sensor therewithin. The at least one sensor is configured to provide the output signal that is indicative of the position of the actuator.

As discussed elsewhere herein, several issues and/or inefficiencies exist with conventional technologies for indicating the position of a valve at a wellsite. For example, the position of a valve actuator where the associated valve controls the flow of fluids towards, through or from a piece of wellsite equipment and it is beneficial to the safe and efficient wellsite operations for one or more operators to know the position of the valve, so as to know the operational state of the wellsite equipment.

The technology of the present disclosure is suitable for several applications and use with different types of wellsite equipment. With reference below to the drawings herein, the present disclosure discusses the technology in the context of indicating the position of an actuator of an accumulator of a wellsite hydraulic system, but it will be appreciated that other applications and wellsite equipment uses are equally applicable, such as an actuator of a hydraulic power unit or a pneumatic power unit or another type of power unit. For example, the embodiments of the present disclosure can be used for detecting and indicating the position of an actuator of at least the following wellsite equipment: a frac flow control unit, a frac zipper-manifold, a frac tree, a wellhead Christmas tree, a blowout preventer, or any actuator therebetween. In some embodiments of the present disclosure, the embodiments of the present disclosure may be used detect and indicate the position of an actuator for controlling any ½ turn valve, ¼ turn valve or other type of rotationally or pivotably actuated valve that forms part of wellsite equipment.

Unless defined otherwise, all technical and scientific terms used herein have the same meaning as commonly understood by one of ordinary skill in the art to which this disclosure belongs. Exemplary terms are defined below for ease in understanding the subject matter of the present disclosure.

As used herein, the term "about", when referring to a measurable value, refers to an approximately +/−10% variation from a given value. It is understood that such a variation is always included in any given value provided herein, whether or not it is specifically referred to.

As used herein, the term "and/or" refers to and encompasses any and all possible combinations of one or more of the associated listed items (e.g. one or the other, or both), as well as the lack of combinations when interrupted in the alternative (or).

As used herein, the term "accumulator" refers to equipment that forms part of a wellsite hydraulic system that is used for opening and closing valves and blowout preventers of wellsite equipment. Accumulators typically have four components: a hydraulic pump, a hydraulic tank, accumulator bottles for storing hydraulic energy and valves for regulating the hydraulic equipment. An accumulator may also be referred to as a closing station or a closing unit. An accumulator may also control the position of a valve actuator of each of the frac tree valves and/or the zipper manifold valves.

As used herein, the term "barksdale" refers to a type of valve on an accumulator that is a rotatable hydraulic shear valve designed for minimal leakage.

As used herein, the term "consultant" refers to a representative of an exploration-and-producing oil company who may be present at the well pad or remote from the well pad and duly authorized to make procedural decisions about operations at the well pad or multiple well pads.

As used herein, the term "frac tree" refers to an assembly of valves, gauges and chokes that are part of a wellhead and used for the fracturing process. The frac tree can be used to control the flow of fluids through, to or from the well, to control pressure between different sections of the wellhead.

As used herein, the term "wellhead" refers to the equipment and components present at the surface end of a well that may include a frac tree, a Christmas tree, a blowout preventer assembly, and that at least partially provides physical support to the well below the surface end.

As used herein, the term "wellhead technician" refers to an individual person who actuates the valves on a wellsite, whether the valves are hydraulically, electronically, pneumatically or manually actuated.

As used herein, the term "well pad" refers to a physical location that comprises two or more wellsites and such wellsites are in proximity to each other to facilitate the sharing of wellsite equipment, personnel and/or other operational infrastructure for operations to be performed on such wellsites.

As used herein, the term "wellsite" refers to a physical location in proximity to one or more geological formations and where well operations are occurring on one or more oil and/or gas wells.

As used here, the term "zipper manifold" also referred to as a "frac zipper manifold" refers to a manifold that is used for conducting and directing high-pressure, hydraulic fracturing fluid from a source into one or more wells on a multi-well pad. Zipper manifolds can include hydraulically actuated or manually actuated valves that regulate the fluid flow within the manifold. Zipper manifold may also be used interchangeably with the terms "frack line" or "trunk line".

The embodiments of the present disclosure will now be described and in reference to FIGS. 1A and 1B through to FIG. 10.

FIGS. 1A and 1B shows one embodiment of an apparatus 100 of the present disclosure, the apparatus 100 is configured for detecting and indicating a position of an actuator 50 of wellsite equipment. FIG. 1A is an isometric view from a first side of the actuator 50 and FIG. 1B is an isometric view from a second side of the actuator 50. In some embodiments, the actuator 50 is an actuator of a hydraulic power unit or a pneumatic power unit or another type of power unit. In some embodiments of the present disclosure, the actuator 50 is an actuator of an accumulator. The position of the actuator 50 is indicative of the position of a valve directly or indirectly actuated by the actuator 50. In some embodiments of the present disclosure the actuator 50 is a handle.

In an embodiment, the apparatus 100 comprises a housing 10 that includes a first housing portion 10A and a second housing portion 10B. As used herein, the term "housing" is intended to refer to a structure that encloses and/or protects and/or couples to and/or otherwise retains in a given, relative position at least a portion of or all of a component of wellsite equipment, such as the actuator. In an embodiment, the housing 10 is operatively coupleable to the actuator 50 by the configuration of the first housing portion 10A. The second housing portion 10B is configured to receive at least one sensor 12 therewithin. By "configured to receive" it is meant that the structure of the second housing portion 10B allows for at least a portion of the at least one sensor 12 to be enclosed and/or protected and/or coupled to and/or otherwise retained by the second housing portion 10B. For example, the second housing portion 10B may have an interior space of suitable size and shape to accommodate at least a portion of the at least one sensor 12. As will be appreciated by those skilled in the art, the first and second housing portions 10A, 10B may otherwise couple to the wellsite equipment and the at least one sensor respectively.

Figure 2:
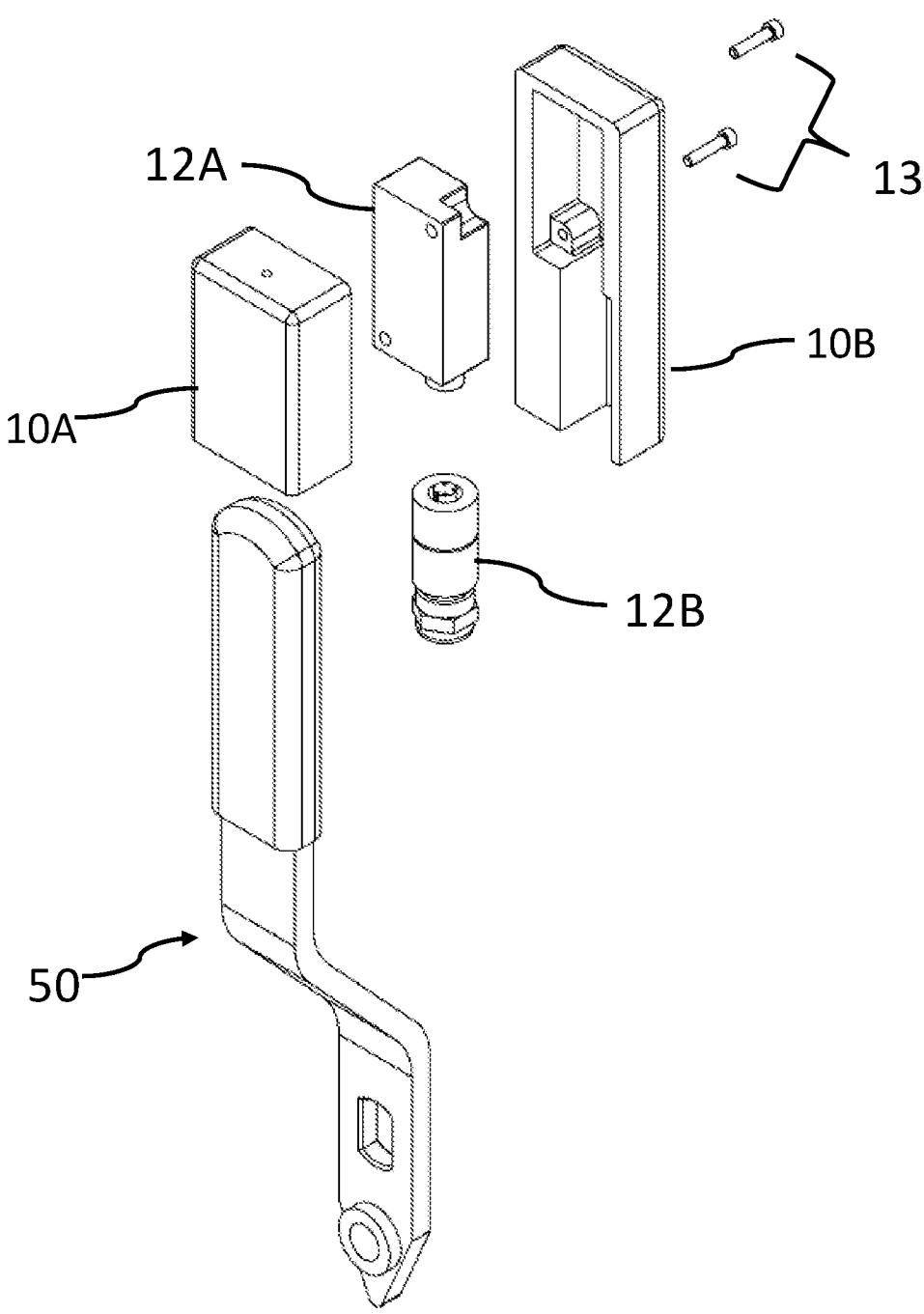
FIG. 2 shows an exploded, isometric view of the apparatus shown in FIGS. 1A and 1B.

The housing 10 may be monolithic or modular. For example, the first housing portion 10A and the second housing portion 10B may be formed as a single monolithic housing 10 or as separate modular portions that together form the housing 10, as shown in the embodiment illustrated in FIGS. 1A and 1B and further illustrated in the exploded view of apparatus 100 in FIG. 2. In embodiments where the first housing portion 10A and the second housing portion 10B are separate and distinct pieces, any suitable securing member 13 may be used to secure the first housing portion 10A to the second housing portion 10B. Non-limiting examples of securing member 13 include screws, pins, bolts or combinations thereof.

The housing 10 may be of any material suitable for withstanding the wellsite environment. In an embodiment, the housing 10 is made of metal or a metallic alloy. In an embodiment, the housing 10 is made of steel. The steel may be conventional steel or high tensile steel. In an embodiment, the housing 10 is made of plastic, a polymer or a polymer blend. The first housing portion 10A and the second housing portion 10B can be made of the same material or not.

The housing 10 may be of any suitable shape and size for coupling to the actuator 50 and to accommodate the at least one sensor 12. The embodiments of the present disclosure can be of various dimensions that are appropriate for coupling to the actuator 50 of a component of wellsite equipment. For example, the shape of the housing 10 may be uniform over the entire housing 10, or not. In some non-limiting examples, the housing 10 may be of suitable shape and size for coupling to a rectangular actuator 50 having a width between about ¼ inch and about 4 inches and a depth between about ¹⁄₁₆ inch and about ⅜ inch (an inch is equivalent to about 2.54 centimeters). In some non-limiting examples, the housing 10 may be of suitable shape and size for coupling to a cylindrical actuator having a diameter between about ⅛ inch and about 2 inches.

Figure 8:
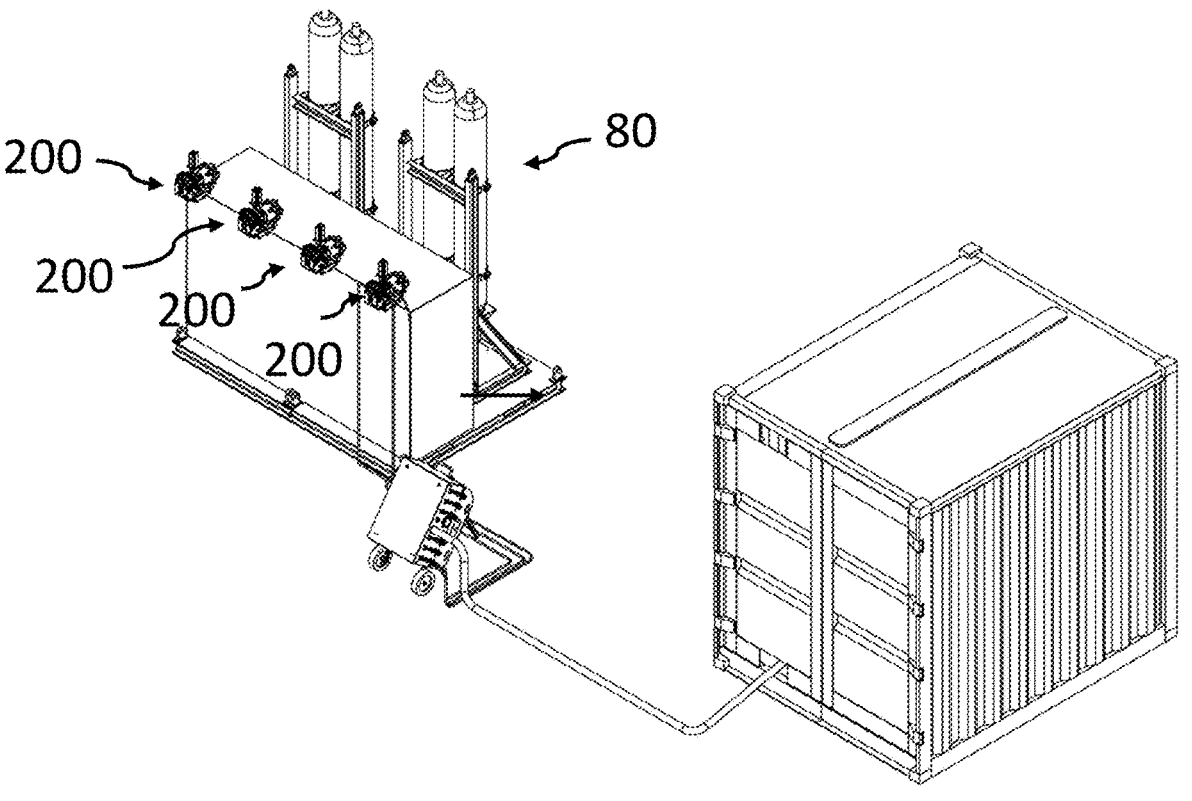
FIG. 8 shows an example of a schematic that represents an accumulator with which one or more embodiments of the present disclosure may be used.

In an embodiment, the first housing portion 10A is operatively coupleable to an actuator 50 such as, for example, a valve handle of an accumulator or other component of wellsite equipment (for example, accumulator 80 shown in FIG. 8). The first housing portion 10A may be coupleable to the actuator 50 by any suitable means. In an embodiment, the first housing portion 10A is coupleable by sliding at least a portion of the first housing portion 10A over the actuator 50. At least one advantage of this coupling configuration is that it may reduce the exposure of any sensitive hardware components of the at least one sensor 12. Furthermore, the apparatus 10 may be installed on an actuator 50 without requiring any tools or using tools that are readily available on a wellsite, which make it easy and quick to install the apparatus 100. In these embodiments, the first housing portion 10A defines a channel that is configured to receive at least a portion of the actuator 50 such as, for example, an end portion of a handle. In an embodiment, the first housing portion 10A is removably couplable to the actuator 50 using a fastener, such as for example, a pin, a dowel, a nut and bolt, a zip tie, a screw or combinations thereof.

The second housing portion 10B is configured to receive at least one sensor 12. The second housing portion 10B may receive the at least one sensor 12 entirely within, or not. In an embodiment, at least a portion of the at least one sensor 12 extends outwardly from the second housing portion 10B. In an embodiment, the at least one sensor 12 is removably couplable to the first housing portion 10A.

The at least one sensor 12 is configured to provide an output signal that indicates the position of at least a portion of the actuator 50 relative to a reference point that is at a fixed position. Examples of sensors 12 that are suitable for use in the apparatus, system, and methods of the present disclosure include an inclinometer, a radio-frequency identification (RFID) tag, a linear position sensor, a rotational position sensor, a potentiometric position sensor, an inductive position sensor, a capacitive proximity sensor, a fiber-optic position sensor, an ultrasonic position sensor, an optical position sensor, a limit switch, a magnetic pickup such as for example a Hall effect sensor, an Inertial Momentum Unit, a MEMS accelerometer, a servo accelerometer, a gyroscope or combinations thereof. In some embodiments of the present disclosure, the at least one sensor 12 is an inclinometer and the position of the actuator 50 is based on the tilt angle of the at least one sensor 12 relative to the fixed position which may be on the horizontal plane, the vertical plane or any plane therebetween. For example, the fixed position may be defined by an end of the actuator 50 that is opposite to the end of the actuator 50 where the at least one sensor 12 is position. The opposite end may define a pivot point about which the actuator 50 pivots between the first and second position for actuating the operational position of an associated valve. Non-limiting examples of inclinometers include manual inclinometers, digital inclinometers, traversing inclinometer probes with or without casing, and in-place inclinometers or combinations thereof.

In other examples of the at least one sensor 12, the fixed position is determined by a second component of the at least one sensor 12 that is in a fixed position. For example, when the at least one sensor 12 is other than an inclinometer, the at least one sensor 12 may further comprise a reference point component (not shown) that is fixed and configured to cooperate with the at least one sensor 12 to determine the relative position of the actuator 50. In one example, the at least one sensor 12 may be a radiofrequency generator and there may be one or two reference point components that are radiofrequency detectors. The one or two reference point components may be fixed to the wellsite equipment proximal to or at the first position and second position of the actuator 50. So that when the actuator 50 is moved to the first position, the radiofrequency signal generated by the at least one sensor 12 will be detected more strongly by the first reference point component and when the actuator 50 is moved to the second position, the radiofrequency signal will be more strongly detected by the second reference point component. As will be appreciated by those skilled in the art, the pairing of the at least one sensor 12 type and the reference point component can vary according to the type of the at least one sensor 12 selected.

In some embodiments, the at least one senor 12 comprises a sensing part 12A and a transmission part 12B. In an embodiment, the sensing part 12A is configured to acquire positional data and provide the data to the transmission part 12B and the transmission part 12B is configured to provide an output signal that communicates the acquired data. In an embodiment, the output signal is an electronic signal receivable by a processor. The processor may process the output signal and electronically communicate the processed signal to a display for establishing a visual signal at the actuator or to a remote display for establishing a visual signal that is remote from the actuator. The visual signal may be a colour, a light, an audio signal or a combination thereof. In an embodiment, the transmission part 12B is an electrical connector that is connectible to a wired or unwired electronic communications connection for communicating between the at least one sensor 12 and the processor (as discussed further below).

In an embodiment, the housing 10 may be covered by or coated with a material such as for example natural rubber, synthetic rubber, silicone, or plastics (e.g. Thermoplastic Elastomer (TPE) or Thermoplastic Polyurethane (TPU)), to allow for improved gripping of the actuator 50. Without being bound by any particular theory, covering the housing with a material may assist with manual operation of the actuator 50 by for example a wellhead technician.

Figures 3A, 3B:
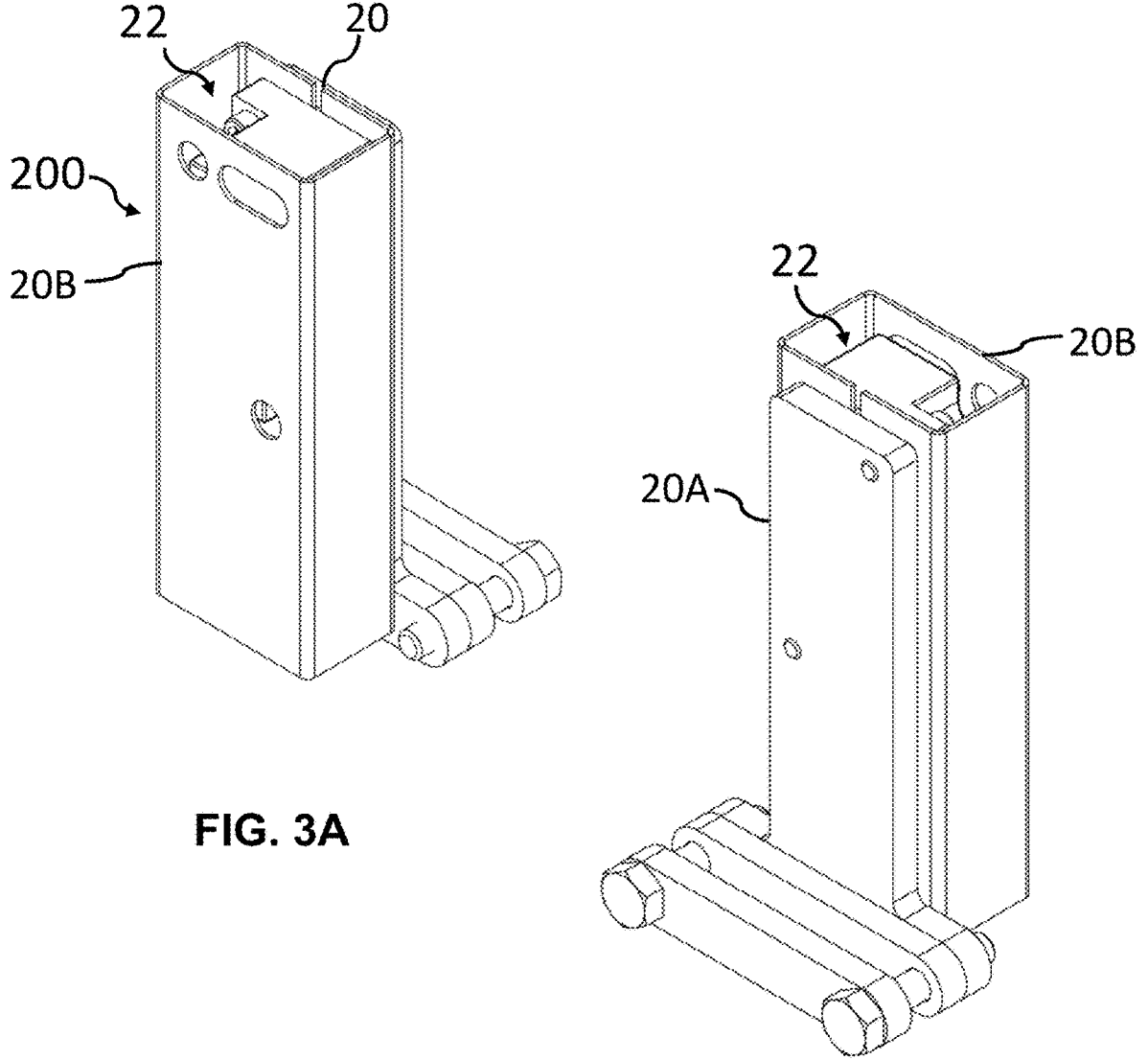

FIGS. 3A and 3B show another embodiment of the present disclosure that relates to an apparatus 200 of the present disclosure, wherein FIG. 3A is an isometric view from a first side of the apparatus 200 and FIG. 3B is an isometric view from a second side of the apparatus 200.

The apparatus 200 has similar features and functionality as the apparatus 100 but in this embodiment the apparatus 200 comprises a first housing portion 20A and a second housing portion 20B. The first housing portion 20A includes a coupling part 24 that is configured to operatively couple the first housing portion 20A to the actuator 50. In this embodiment, the first housing portion 20A of the housing 20 may be solid or hollow or may have portions that are solid and portions that are hollow. The second housing portion 20B is configured to house at least one sensor 22, which can be the same as the at least one sensor 12 described herein above.

In an embodiment, the apparatus 200 may be operatively coupled to the actuator 50 (see FIGS. 5A and 5B) by the coupling part 24 and secured thereto by securing components 23. In an embodiment, the coupling mechanism 24 is configured to exert a clamping force on the actuator 50 to releasably couple the apparatus 200 to the actuator 50. The clamping force may be adjustable by any suitable means, such as for example a screw, an over-center latch, a strap, or a nut and bolt. In an embodiment, the coupling mechanism 24 may comprise any other apparatus for releasably coupling the apparatus 200 to the actuator 50 such as a one or more of a magnetic assembly, a releasable adhesive, a hook and loop assembly or other releasable coupling apparatus of similar functionality. The housing 20 may be of any material, size and shape as described for the housing 10 of the apparatus 100.

Figure 4:
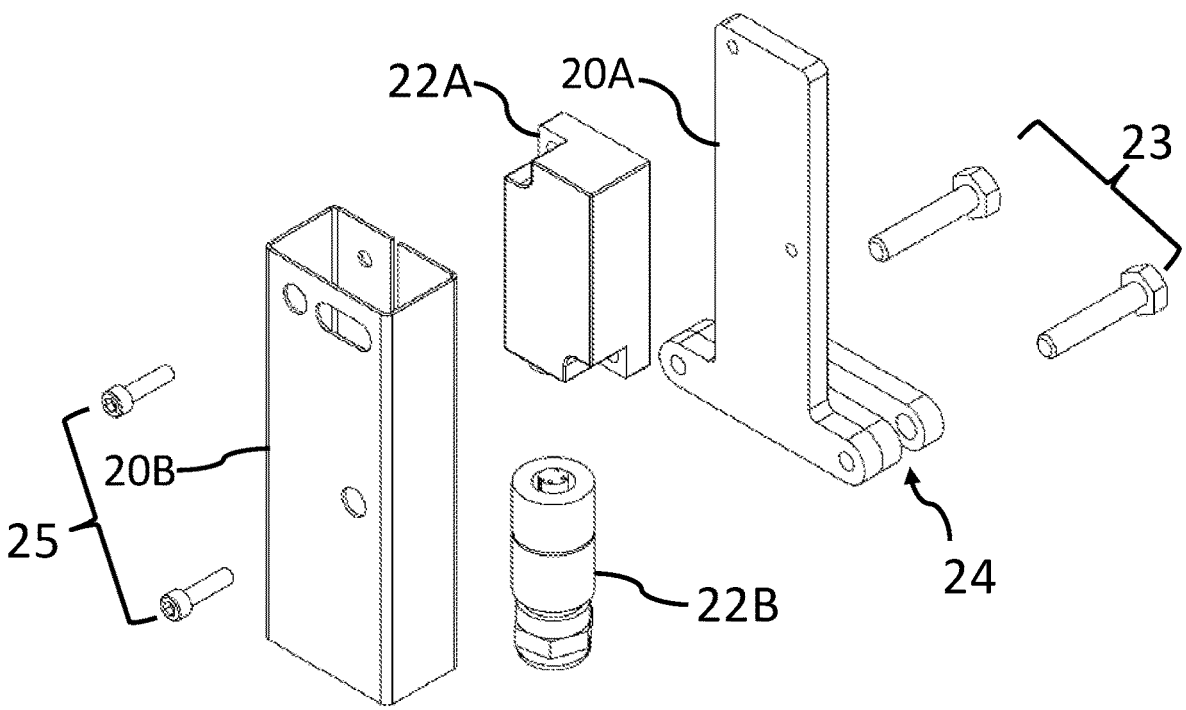
FIG. 4 shows an exploded, isometric view of the apparatus shown in FIGS. 3A and 3B.

FIG. 4 shows an exploded, isometric view of the apparatus 200 shown in FIGS. 3A and 3B. In some embodiments, the at least one sensor 22 may comprise a sensing part 22A and a transmission part 22B. In an embodiment, the transmission part 22B is an electrical connector. The sensing part 22A and the transmission part 22B may be received entirely within the housing, or not. By "received entirely within" it is meant that no part of the sensor extends outwardly from the housing 22 when the apparatus 200 is in an operable state so as to protect the sensor 22 from weather elements and physical contacts.

In an embodiment, the first housing portion 20A and the second housing portion 20B may be coupled together using at least one securing mechanism 25. In an embodiment of the present disclosure where the housing 22 is monolithic, the at least one securing mechanism 25 may not be necessary. The at least one securing mechanism 25 may also secure the at least one sensor 22 within the housing 22. Non-limiting examples of suitable securing mechanisms 25 include bolts, dowels, pins, screws and of securing mechanisms of similar function.

Figure 5A:
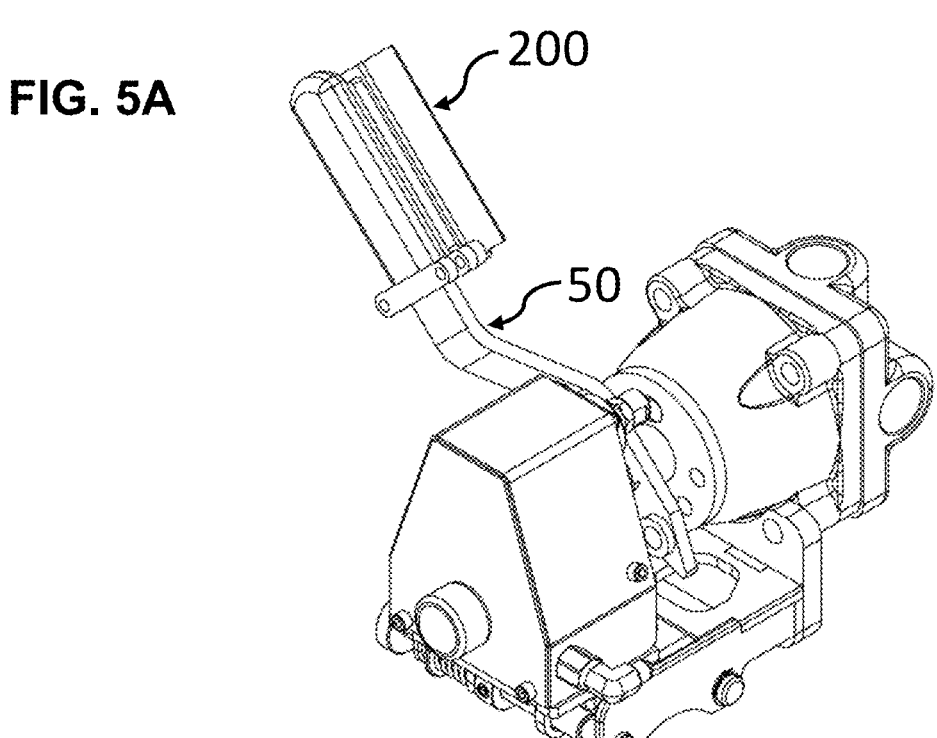
Figure 5B:
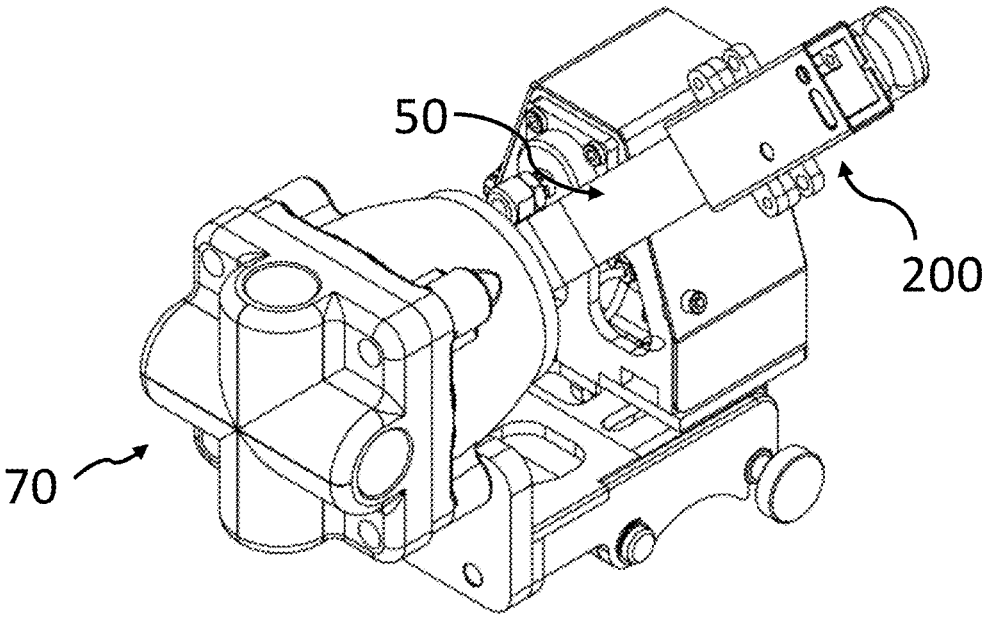

FIGS. 5A and 5B illustrate an exemplary embodiment of the apparatus 200 coupled to an actuator 50, wherein FIG. 5A shows an isometric view of the apparatus in a first position from a first end of an accumulator; and FIG. 5B shows an isometric view of the apparatus in the first position from a second end of the accumulator.

Figure 7:
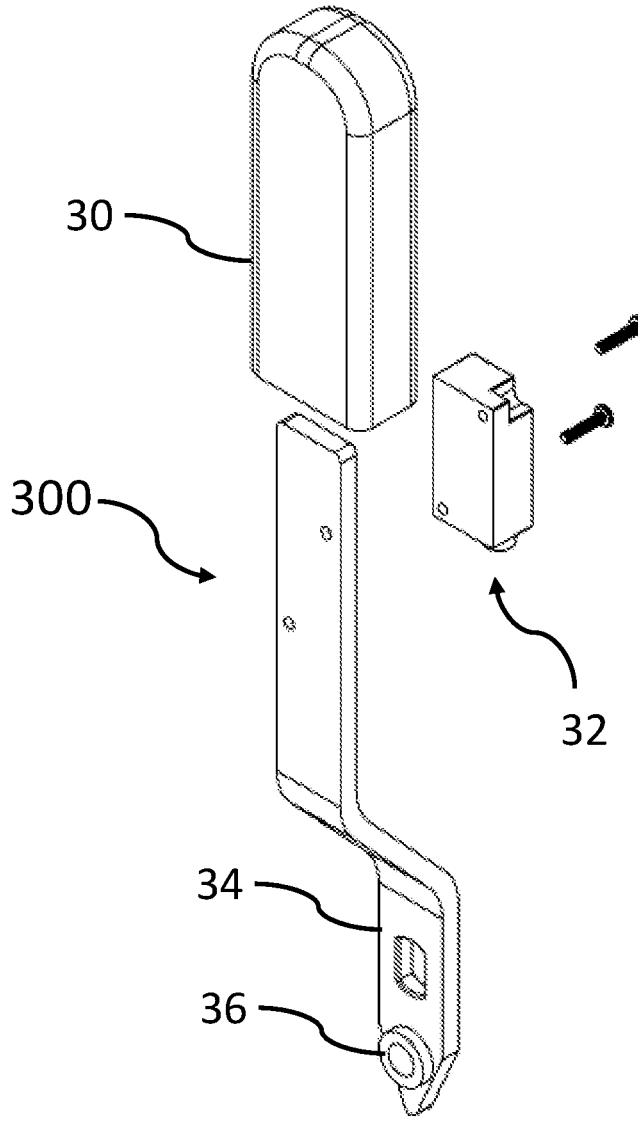
FIG. 7 is an exploded, isometric view of the apparatus shown in FIGS. 6A, 6B, 6C and 6D.

FIGS. 6A, 6B, 6C and 6D show another embodiment of an apparatus 300 of the present disclosure, wherein FIG. 6A is an isometric view from a first side of the apparatus 300, FIG. 6B is a side view of the apparatus 300, FIG. 6C is a view from a second side of the apparatus, and FIG. 6D is a top plan view. FIG. 7 is an exploded view of the apparatus 300.

The apparatus 300 has similar features and functionality as the apparatus 100 and the apparatus 200 but in this embodiment the apparatus 300 is already coupled to a replacement actuator 34. The replacement actuator 34 can be used to replace an actuator that is part of the wellsite equipment.

The apparatus 300 comprises a housing 30, at least one sensor 32 received within the housing 30, and the replacement actuator 34. In an embodiment, the housing 30 is operatively coupled to the replacement actuator 34. In an embodiment, the housing 30 is coupled to the replacement actuator 34 by a fastener such as the fasteners described elsewhere herein, either releasably or not. In other embodiments of the present disclosure, the housing 30 and the replacement actuator 34 may be a monolithic unit. The housing 30 may be of any material, size and shape as described elsewhere herein. In an embodiment, housing 30 comprises an interior space into which the at least one sensor 32 is recessed and secured. The at least one sensor 32 may be any of the sensors described elsewhere herein. In an embodiment, the at least one sensor 32 is an inclinometer.

In an embodiment, the replacement actuator 34 may be made from steel. In an embodiment, the apparatus 300 comprises a rubberized cover.

In some embodiments, the apparatus 300 is configured to replace an existing actuator of wellsite equipment by operatively securing the apparatus 300 to the wellsite equipment so that actuation of the replacement actuator 34 will cause a valve (for example, shown as 70 in FIG. 5A) of the wellsite equipment (for example, shown as 80 in FIG. 8) to actuate in the same fashion as it had before the replacement actuator 34 was operatively secured to the wellsite equipment. The securing may be by any suitable mechanism (shown as 36 in FIGS. 6A, 6B, and 6C), including those for operatively coupling an actuator to a valve, such as a hex bolt and bolt aperture that is defined at one end of the apparatus 300.

At least one advantage of the apparatus 300 is that the overall dimensions may be reduced and there may be less exposed parts. Additionally, the housing 30 may be used as a mechanical guard to house/enclose electronic components of the sensor 32.

FIG. 8 illustrates a series of accumulators with which one or more embodiments of the present disclosure may be used.

In an embodiment, the present disclosure provides a system 1000 for detecting and indicating a position of an actuator of wellsite equipment, the system 1000 comprising: an apparatus 100, 200, or 300 comprising: at least one sensor for detecting the position of the actuator and providing an output signal that indicates the position of the actuator; and a housing comprising a first housing portion operatively coupleable to the actuator, or optionally coupled to the replacement actuator 34, and a second housing portion configured to receive the at least one sensor therewithin. The system 100 further comprises a processor 400 for receiving and processing the output signal into a processed output signal.

As used herein, the term "processor" is intended to refer to a computing unit that executes a program. In an embodiment, the program executed converts the output signal from the at least one sensor into a processed output signal. The processor 400 may be one or more single-core or multiple-core computing processors such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, CA, USA, under the ARM® architecture, or the like.

The apparatus may be any apparatus as described herein. In an embodiment, the sensor is an inclinometer. In an embodiment, the actuator is an actuator of a hydraulic power unit or a pneumatic power unit or another type of power unit or other type of power unit. In an embodiment, the actuator is an actuator of an accumulator.

In an embodiment, the system 1000 for detecting and indicating a position of an actuator further comprises a remote display unit 500 for receiving the processed signal and displaying an image indicative of the position of the actuator. By "remote display unit" it is meant that the display unit is not at the well. For example, the remote display unit may be in a service truck, a trailer or a control center at the well site or in a remote location away from the well site. The remote display unit 500 may comprise one or more display modules for displaying images, such as monitors, LCD displays, LED displays, projectors, and the like. The remote display unit 500 may be a physically integrated part of the processor 400 and/or the user interfaces (for example, the display of a laptop computer or tablet), or may be a display device physically separate from, but functionally coupled to, other components of the processor and/or the user interfaces (for example, the monitor of a desktop computer). In an embodiment, the remote display unit 500 may be a Human-Machine-Interface (HMI). At least one advantage of the remote display unit 500 is a reduction of transport of individuals to wellsite locations. Another advantage of a remote display unit 500 is that multiple wellsites/well pads can be monitored at a centralized control center.

In some embodiments, the systems described herein may be integrated into an existing control system at a wellsite and/or at a remote location.

Figure 9:
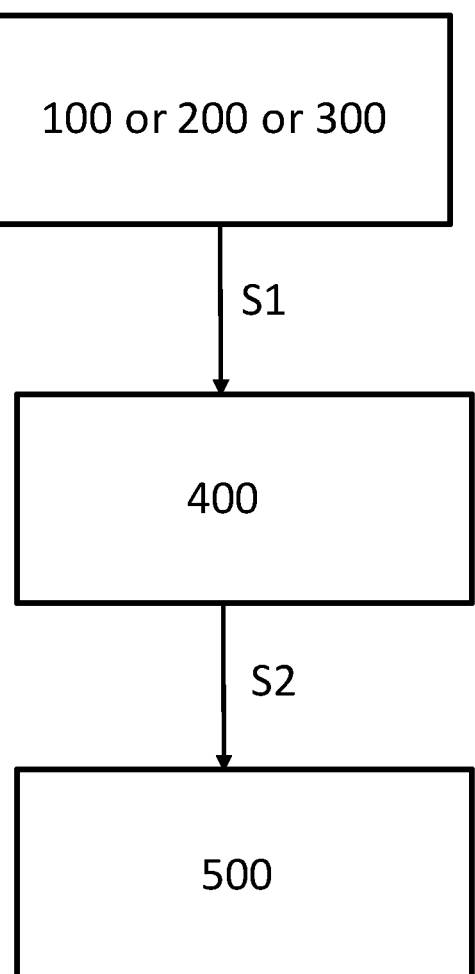
FIG. 9 is a schematic that represents a system, according to embodiments of the present disclosure, for detecting and indicating the position of an actuator according to embodiments of the present disclosure.

FIG. 9 is a schematic of an exemplary embodiment of the system 1000 of the present disclosure, wherein S1 and S2 represent the output signal and the processed output signal, respectively.

As will be appreciated by those skilled in the art, the detected position of the actuator is indicative of the position of a valve that is operatively coupled to the actuator, for example, a valve whose operational position controls the flow of fluids towards, through or away from a piece of wellsite equipment. The output signal generated by the at least one sensor 12 may indicate that the actuator is in a first position and, therefore, it is indicated that the valve actuated by the actuator is in an open position. When the output signal indicates the actuator is in a second position, the output signal will indicate that the valve is in a closed position. Actuating the valves between an open position and a closed position regulate the flow of fluids through a valve, which in turn regulates the flow of fluids towards, through or away from the associated wellsite equipment. In some embodiments, the output signal may indicate that the actuator is in an intermediate position between the first position and the second position and, therefore, this indicates that the valve is in a partially open position and fluid flow through the valve may be partially restricted as compared to when the valve is in an open position.

In some embodiments, the present disclosure provides a method 2000 for detecting and indicating a position of an actuator of wellsite equipment. The method 2000 comprises a step 2100 of securing an apparatus to the actuator, the apparatus comprising: at least one sensor for providing an output signal indicative of the position of the actuator; and a housing comprising a first housing portion operatively coupled to the actuator and a second housing portion receiving the at least one sensor therewithin. The method 2000 also comprises a step of detecting 2200 the position of the actuator, relative to a fixed point (or otherwise), a step 2202 of indicating the detected position of the actuator by communicating an output signal. Optionally, the method comprises a step 2204 of observing the output signal so that operators of one or more services being performed at a given well can make operational decisions.

In an embodiment, the step 2100 of securing comprises slideable engagement of the apparatus with the actuator, fastening by a fastener, engaging a coupling mechanism, such as the coupling mechanism 24 described elsewhere herein, application of adhesives, increasing the clamping force between opposed clamping faces of the coupling mechanism 24 about the actuator or combinations thereof.

The step 2200 of detecting a position of the actuator is performed by the at least one sensor that is configured to detect a position of at least a portion of the actuator 50 relative to a reference point that is at a fixed position. As described herein above, the at least one sensor 12 may connected at one end of the actuator and the position of that respective end of the actuator relative to a fixed position is one manner by which step 2200 is completed. The fixed position may be the opposite end of the actuator 50, which defines a pivot point about which the actuator pivots or the fixed point may be defined by the second component of the at least one sensor 12 or a combination thereof.

In some embodiments of the present disclosure, the step 2202 of indicating comprises: a step 2210 of processing the output signal into a processed output signal; and a step 2220 of converting the processed output signal and transmitting the processed output signal, via wired or wireless electronic communication, for display on a display unit, that may be remote from the actuator itself or not. In an embodiment, the processing step is by a processor such as the processor 400 described elsewhere herein. In an embodiment, the display unit may be the remote display unit 500 described elsewhere herein. In an embodiment, the image is a graphical image, an alphanumeric image, a colour, or any combination thereof. In an embodiment, a change of the graphical image, such as for example a colour change, may indicate whether the actuator is in a first position, a second position or therebetween.

In an embodiment, the processed output signal (and the associated image displayed on a remote display unit) indicates the actuator position. The actuator position indicates the operational position of a valve being actuated by the actuator being with the operational position of the valve being an open position, a closed position, or, optionally, an intermediate position.

The image on the display unit may inform a consultant to make operational decisions about service operations being performed at the well pad for example, for example whether or not to actuate one or more valves of wellsite equipment, turn on or off one or more fluid pumps, extend or retract wireline or coiled tubing from the well, or other operational decisions that are apparent to those skilled in the art.

Figure 10:
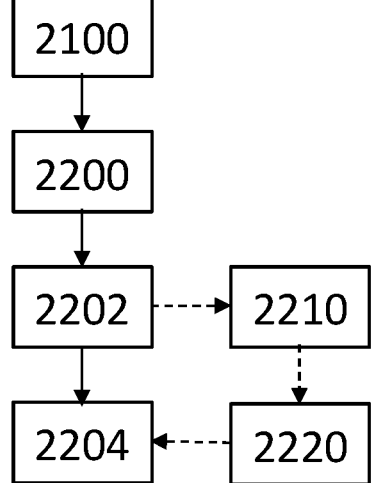
FIG. 10 shows to schematics that each represent a method for detecting and indicating the position of an actuator according to embodiments of the present disclosure.
Figure 10:
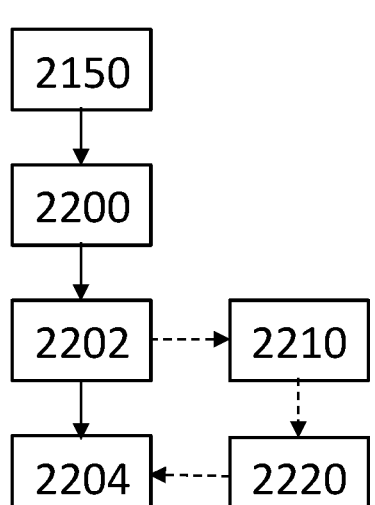

FIG. 10 also shows a further method 2000A for detecting and indicating a position of an actuator of wellsite equipment. Method 2000A has many of the same steps as method 2000, described above, and they may be performed by similar apparatus. The primary difference between the two methods is that method 2000A starts with a step of securing an actuator that already includes the apparatus 300 and the first step 2150 is replacing an actuator that forms part of the wellsite equipment of interest with the apparatus 300. The other steps of method 2000A may be the same as method 2000.

What is claimed is:

1. A system for detecting and indicating a position of an actuator of wellsite equipment, the system comprising:
   a. an apparatus comprising:
      i. at least one sensor configured to detect the position of the actuator and to provide an output signal that indicates the position of the actuator; and
      ii. a housing comprising a first housing portion and a second housing portion, the first housing portion defines a channel for slidably and releasably coupling to the actuator of the wellsite equipment and the second housing portion configured to receive the at least one sensor therewithin; and
   b. a processor for receiving and processing the output signal into a processed output signal.

2. The system of claim 1, wherein the at least one sensor is an inclinometer, a radio-frequency identification (RFID) tag, a linear position sensor, a rotational position sensor, a potentiometric position sensor, an inductive position sensor, a capacitive proximity sensor, a fiber-optic position sensor, an ultrasonic position sensor, an optical position sensor, a limit switch, a magnetic pickup such as for example a Hall effect sensor, an Inertial Momentum Unit, a MEMS accelerometer, a servo accelerometer, a gyroscope or a combination thereof.

3. The system of claim 1, wherein when the output signal indicates the actuator is in a first position, a valve actuated by the actuator is in an open position and when the output signal indicates the actuator is in a second position, the valve is in a closed position.

4. The system of claim 1, further comprising a display unit for receiving the processed signal and displaying an image that indicates the position of the actuator.

5. The system of claim 4, wherein the display unit is remote from the actuator.

6. A method for detecting and indicating a position of an actuator of wellsite equipment, the method comprising:
   a. slidably securing an apparatus to the wellsite equipment, the apparatus comprising:
      i. at least one sensor configured to detect the position of the actuator and to generate an output signal that indicates the position of the actuator; and
      ii. a housing comprising a first housing portion and a second housing portion, the first housing portion defines a channel for slidably and releasably coupling to the actuator of the wellsite equipment and the second housing portion configured to receive the at least one sensor therewithin,
   b. detecting the position of the actuator; and
   c. indicating the position of the actuator by generating the output signal.

7. The method of claim 6, wherein the actuator position is indicative of a valve actuated by the actuator being in an open position, in a closed position, or in an intermediate position.

8. The method of claim 6, further comprising a step of operatively coupling the actuator to a valve of the wellsite equipment so that actuating the actuator moves the valve between an open position, a closed position and therebetween.

9. The method of claim 6, wherein the step of securing comprises a fastening the apparatus to the actuator by a fastener, by a coupling mechanism or combinations thereof.

10. The method of claim 9, wherein the step of indicating comprises:
   a. a step of processing the output signal into a processed output signal;
   b. a step of converting the processed output signal to an image; and
   c. displaying the image on a display unit.

11. The method of claim 10, wherein the image is indicative of the actuator position.

* * * * *